Jan. 13, 1959                J. B. SNOY                2,868,341
DOUBLE ACTING CLUTCH
Filed April 1, 1957                              2 Sheets-Sheet 2
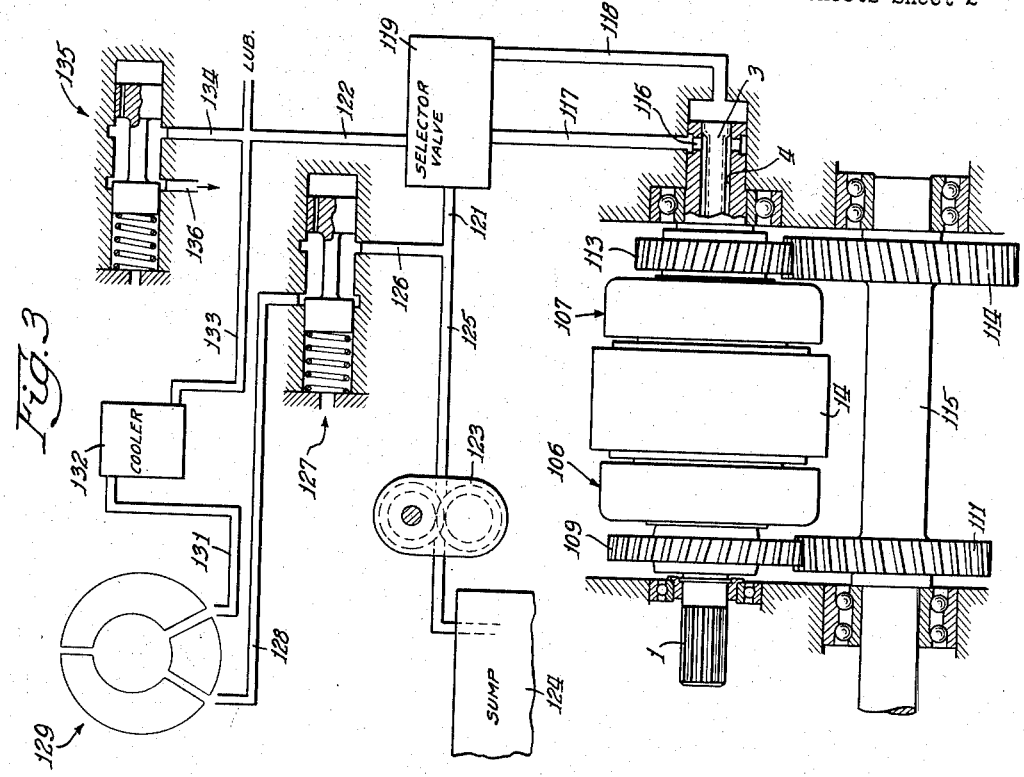
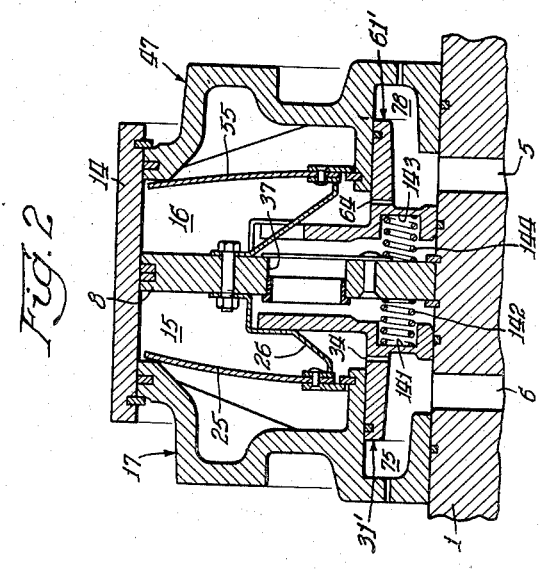
Inventor:
Joseph B. Snoy
By:
Donald W. Banner   Atty.

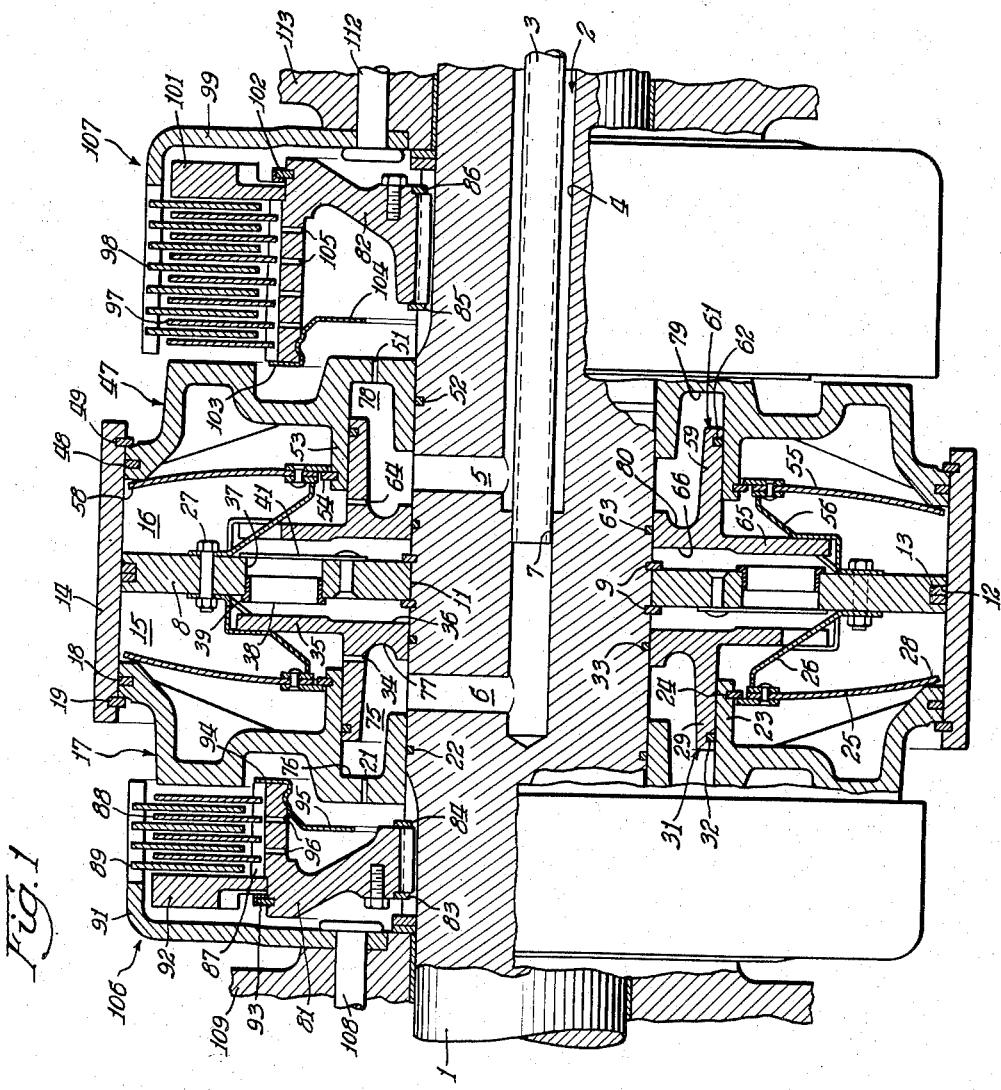

ary Office 2,868,341
Patented Jan. 13, 1959

2,868,341

DOUBLE ACTING CLUTCH

Joseph B. Snoy, Rockford, Ill., assignor to Borg-Warner Corporation, Chicago, Ill., a corporation of Illinois Application April 1, 1957, Serial No. 649,830

8 Claims. (Cl. 192—87)

This invention relates to hydraulically operated clutch mechanisms, and more particularly to hydraulically operated clutch mechanisms of the type designed to operate either of a pair of opposed clutch packs.

In the copending application of Elmer A. Richards and myself, Serial Number 593,479, filed June 25, 1956, and entitled "Double Hydraulic Operated Clutch Device" there is disclosed and claimed a new and improved hydraulically operated clutch mechanism which is simpler, faster operating and providing, nevertheless, better cushioned engagement than any device of a comparable nature previously known to us. The present invention is an improvement over that described in the aforementioned copending application.

It is one object of the present invention to provide a new and improved hydraulically operated clutch device operable with a lower hydraulic pressure than heretofore possible while yet retaining features of hydraulic balance, smoothness in operation and rapidity of action.

Another object of the present invention is the provision of a new and improved hydraulically operated clutch device in which a central reaction plate is provided having simple and inexpensive valving mechanisms associated therewith to control transfer of hydraulic fluid from one compartment adjacent one side of the reaction plate to the compartment at the opposite side of the reaction plate.

Other objects and features of the invention will be readily apparent to those skilled in the art from the specification and appended drawings illustrating certain preferred embodiments in which:

Figure 1 discloses a central longitudinal sectional view through the device incorporating the principles of the present invention;

Figure 2 is a partial view similar to Figure 1 illustrating a device having a modified form of the present invention;

Figure 3 is a schematic diagram illustrating a circuit containing devices of the type illustrated in Figures 1 and 2.

In Figure 1 there is disclosed a longitudinally extending, rotatable shaft 1 adapted for connection to a prime mover, such as an internal combustion engine (not shown) having an elongated bore 2 extending axially therein. Disposed within the bore 2 is an imperforate tube 3 extending partway through the bore 2, as illustrated in Figure 1, and having an outer diameter such as to be spaced from the sides of an enlarged portion of the bore 2 to define an annular fluid channel 4 therebetween. In fluid communication with the channel 4 are a plurality of circumferentially spaced, radially extending ports 5 extending to the exterior of the shaft 1; also extending from the bore 2 to the exterior of the shaft 1 are a plurality of circumferentially spaced, radially extending ports 6 which, as disclosed in Figure 1, are in fluid communication with the tube 3 but not in communication with the channel 4 in view of the fact that the exterior of the tube 3 is in fluid tight engagement at 7 with a reduced diameter portion of the bore 2.

Disposed upon the shaft 1 for rotation therewith is a reaction plate 8 prevented from axial movement by snap rings 9, the reaction plate 8, however, having a central circular aperture therein numbered 11, the sides of which engage the exterior surface of the shaft 1 so that the plate 8 is rotatable therewith. The reaction plate 8 is annular in configuration, and is provided at its outer periphery with an annular groove 12 within which is disposed a sealing ring 13. The sealing ring 13 is disposed in engagement with the inner surface of a generally annular piston housing 14 which is imperforate so as to contain hydraulic fluid, as will be more fully described hereinafter. It will be seen that the plate 8 in effect divides the interior of piston housing 14 into a pair of spaced fluid chambers 15 and 16.

Mounted to the shaft 1 so as to be axially movable with respect thereto is an annular piston 17. The outer periphery of the piston 17 is provioed with a seal 18 disposed in engagement with the inner surface of piston housing 14 to prevent leakage of hydraulic fluid between piston 17 and the piston housing. A snap ring 19 is provided in a suitable groove in the piston housing 14 which engages the left side of piston 17, in the view of Figure 1, to prevent further movement to the left of the piston 17. A plurality of circumferentially spaced apertures 21 are provided which extend through an inner portion of piston 17 to provide metered cooling flow of fluid to the clutch plates, and suitable sealing means 22 are provided in shaft 1 between the shaft and the annular central opening in piston 17 to prevent fluid flow therebetween. The piston 17 has integrally formed therewith an inwardly extending, annular ledge 23, an inner portion of which carries a snap ring 24. An annular spring 25 having an annular central opening therein seated upon the ledge 23 is provided, the innermost portion of which is engaged by a bracket 26 rigidly connected at one end by bolts 27 to the reaction plate 8, the opposite end of bracket 26 engaging spring 25. The spring 25 has a plurality of spaced, radially extending fingers 28 which engage an inwardly facing, upper portion of the piston 17 to bias it away from plate 8.

The radially under side of the annular ledge 23 is disposed in engagement with the radially outer surface of an annular ledge 29 of an annular accelerating piston 31, suitable sealing means 32 being provided between the ledges 23 and 29 to prevent fluid flow therebetween. The piston 31 has a central, circular aperture disposed therein in contact with the outer periphery of the shaft 1, sealing means 33 being provided to prevent fluid flow between the shaft and this piston, piston 31 being axially movable relative to the shaft 1 as further described hereinafter. The ledge 29 of piston 31 has opening means 34 extending therethrough to provide restricted fluid communication between the chambers at the radially opposite sides of the ledge 29. The radially extending portion of the piston 31 comprises a radially outer annular portion 35, having a plurality of suitable openings through which portions of the brackets 26 extend, and radially inwardly thereof is an annular surface 36 facing the reaction plate 8 and spaced therefrom to a greater degree than the face of the radially outer portion 35 of the piston 31.

In radial registry with the portion 35 of the piston 31, are a plurality (preferably 6) of openings 37 which extend through the reaction plate 8. Each of these openings 37 is provided with a one-way valve arrangement, which respectively alternate in flow direction, and each of which comprises a rubber bushing 38 facing one side of the reaction plate and having a shoulder 39 engaging a side of the reaction plate 8; each of the one-way valves further comprises a flexible, metal flapper 41 having one end thereof only fixedly connected, as by riveting, to the reaction plate 8 and disposed on the side of the associated opening 37 opposite to that of the associated bushing 39, the flapper 41 being sufficiently large in area to overlie the entire associated opening side. As a result of this arrangement, it will be apparent to those skilled in the art that fluid flow may normally occur in one direction through any opening 37, but flow in the opposite direction through that opening is prevented. As previously indicated, and as shown in Figure 1, the one-way valves in each of the openings 37 are respectively reversed as the openings 37 are respectively considered circumferentially, so that alternate openings permit flow through reaction plate 8 in opposite directions.

Also mounted to the shaft 1 so as to be axially movable with respect thereto is an annular piston 47. The outer periphery of the piston 47 is provided with a seal 48 disposed in engagement with the inner surface of annular piston housing 14 to prevent leakage of hydraulic fluid between piston 47 and the piston housing. A snap ring 49 is provided with a suitable groove in the piston housing 14 which engages the right side of piston 47, in the view of Figure 1, to prevent further movement to the right of the piston 47 relative to the piston housing. A plurality of circumferentially spaced apertures 51 are provided which extend through an inner portion of piston 47 to provide metered cooling flow of fluid to the clutch plates, and suitable sealing means 52 are provided in shaft 1 between the shaft and the annular central opening in piston 47 to prevent fluid flow therebetween. The piston 47 has integrally formed therewith an inwardly extending, annular ledge 53, an inner portion thereof carrying a snap ring 54. An annular spring 55 is provided which has an annular central opening therein seated upon the ledge 53, the innermost portion of the spring 55 being engaged by a bracket 56, similar to the bracket 26, rigidly connected at one end by bolts 27 to the reaction plate 8, the opposite end of bracket 56 engaging the spring 55. The spring 55 has a plurality of spaced, radially extending fingers 58 which engage an inwardly facing, upper portion of the piston 47 and tend to bias it toward the right in the view of Figure 1.

The radially under side of the annular ledge 53 is disposed in engagement with the radially outer surface of an annular ledge 59 integrally formed on an annular accelerating piston 61. Suitable sealing means 62 are provided between the ledges 53 and 59 to prevent fluid flow therebetween. The piston 61 has a central, circular aperture disposed therein in contact with the outer periphery of the shaft 1, piston 61 being axially movable, however, relative to the shaft 1. Sealing means 63 are provided which prevent fluid flow between the shaft 1 and piston 61. The ledge 59 of piston 61 has opening means 64 extending therethrough to provide restricted fluid communication between the chambers at the radially opposite sides of the ledge 59. The radially extending portion of the piston 61 comprises a radially outer annular portion 65, having a plurality of suitable openings through which portions of the brackets 56 extend, as illustrated in Figure 1, and radially inwardly thereof is an annular surface 66 facing the reaction plate 8 and spaced therefrom to a greater degree than the face of the radially outer portion 65 of the piston 61.

From the foregoing description it will be seen that the piston housing 14, the pistons 17 and 47, the reaction plate 8, and the pistons 31 and 61 define fluid chambers 15 and 16 within the piston housing 14 which normally are in fluid communication through the one-way valves in the openings 37 in the reaction plate 8. In addition, radially inwardly of the chamber 15 another annular fluid chamber 75 is formed by the outer surface of the piston shaft 1, an annular surface 76 integral with the piston 17, the radially inner portion of ledges 23 and 29, and an annular surface 77 on piston 31. Chamber 75 is in fluid communication at all times with the ports 6, and fluid may pass out of this chamber through the restricted apertures 21, and also through the restricted opening means 34 in the ledge 29. Similarly, radially inwardly of chamber 16 another annular chamber 78 is formed by the outer surface of shaft 1, an annular surface 79 on the piston 47, the annular under surfaces of ledges 53 and 59, and an annular surface 80 on piston 61. Chamber 78 is in fluid communication at all times with the ports 5; fluid may flow out of the chamber 78 through the restricted apertures 51 in the piston 47, and also through the restricted opening means 64 in the ledge 59.

Splined from the shaft 1 at opposite sides of the aforedescribed cylinder assembly are clutch hubs 81 and 82 respectively which are generally annular in configuration. Hub 81 is prevented from axial movement along the shaft 1 by snap rings 83 and 84, while hub 82 is prevented from axial movement along the shaft 1 by similar snap rings 85 and 86. The outer periphery of hub 81 has integrally formed thereon splines 87 which engage complementary splines on clutch plates 88 which are interleaved with other clutch plates 89, the latter being splined to an annular cup-shaped clutch drum 91. Also mounted upon the hub 81 are clutch backing means 92 fixed against axial movement to the left, in the view of Figure 1, by a snap ring 93. A retainer plate 94 is fixed to the innermost facing portion of hub 81 which has an inwardly directed portion 95 which serves to direct fluid flowing through the apertures 21 toward a plurality of suitable holes 96 in the hub 81 and therefore into engagement with the clutch plates 88 and 89.

In similar fashion, in splined engagement with the outermost surface of the hub 82 are a plurality of clutch plates 97 intermeshed with a plurality of clutch plates 98 splined to a cup-shaped clutch drum 99. Also mounted on the hub 82 is a backing plate 101 fixed against movement to the right in the view of Figure 1, by a snap ring 102. A retainer plate 103 is mounted to the inwardly facing portion of hub 82, plate 103 having an inwardly directed portion 104 which serves to direct fluid flowing through the apertures 51 into engagement with the clutch plates 97 and 98 through a plurality of suitable holes 105 in the hub 82.

It will therefore be seen that the intermeshing clutch plates 88 and 89 form a clutch pack indicated in general by the numeral 106, while the intermeshing clutch plates 97 and 98 form a clutch pack indicated in general by the numeral 107.

The clutch drum 91 is fixedly mounted by means of rivets 108 to a gear 109, rotatably mounted on the shaft 1, and intermeshing with other gearing 111 (Figure 3). Similarly, the clutch drum 99 is fixedly mounted, such as by rivets 112, to a gear 113 rotatably mounted about the the shaft 1 and intermeshing with other gearing 114 (Figure 3).

It will be obvious to those skilled in the art that in the condition illustrated in Figure 1, neither the gear 109 nor the gear 113 will be driven from the shaft 1. When the clutch pack 106, however, is engaged, rotative power will be transmitted from the shaft 1 to the gear 109 and the gearing 111. Similarly, when the clutch pack 107 is engaged rotative power will be transmitted from the shaft 1 to the gear 113 and the gearing 114.

In Figure 3 there is shown schematically an operative system employing the device of the present invention. In that figure shaft 1 is illustrated carrying the clutch packs 106 and 107, the piston housing 14, and the other elements therein previously described. Gear 109 is shown in meshing relation with gearing 111, the latter being mounted upon a suitable countershaft 115 so that upon engagement of the clutch pack 106, power is transmitted from the engine, through the shaft 1, the clutch pack 106, gear 109, gearing 111 and countershaft 115 which is attached by suitable means to the drive wheels of the vehicle (not shown). Similarly, upon engagement of the clutch pack 107 power will flow from the engine to the shaft 1, clutch pack 107, gear 113, gearing 114 to the countershaft 115, and from the countershaft 115 to the driving wheels of the vehicle. Obviously the gear ratio between the gear 109 and the gearing 111 is different than the ratio between the gear 113 and the gearing 114 so that the shaft 115 will be driven at one speed when the clutch pack 106 is engaged and at a different speed when the clutch pack 107 is engaged. It will also be apparent that an idler gear can be interposed between the gears illustrated so that a reverse drive may be accomplished by engagement of a suitable clutch pack.

To supply hydraulic fluid to the piston housing 14, as shown in Figure 3, the shaft 1 is provided with radially extending ports 116 in fluid communication with the channel 4 (formed in the shaft 1 between the periphery of the bore 2 therein and the tube 3). The ports 116 are in fluid communication with hydraulic fluid carrying means 117. Similarly, hydraulic fluid carrying means 118 are provided which are in fluid communication with the tube 3, the hydraulic fluid carrying means 117 and 118 being hydraulically isolated from each other. The fluid carrying means 117 and 118 are respectively connected to a selector valve 119, which is supplied by a high pressure fluid carrying line 121 and a low pressure fluid carrying line 122. The selector valve 119 may be of conventional type which, when in one position, will permit fluid flow from the low pressure line 122 to both of the fluid carrying means 117 and 118 simultaneously; when the selector valve 119 is placed in a different position, the low pressure line will be connected to one of the fluid carrying means 117 or 118, and the high pressure line 121 will be connected to the other of these fluid carrying means. In another position of the selector valve 119, the opposite fluid carrying means will be connected to the high pressure line while the other fluid carrying means will be connected to the low pressure line.

The lines 121 and 122 are supplied with hydraulic fluid from a suitable pump 123 in fluid communication with a sump 124. The pump 123 delivers high pressure fluid to a line 125 which is in turn connected to the junction between the high pressure line 121 and a line 126, the latter being in fluid communication with a regulator valve 127 of conventional design adapted to maintain the pressure in line 121 at a desired level. The regulator valve 127 is in turn connected to a hydraulic line 128 which carries fluid to a torque converter 129 of the vehicle in which the device incorporating the present invention is disposed, the converter having an output hydraulic line 131. Line 131 is connected to a cooler 132, through which the hydraulic fluid flows to a line 133 which is in fluid communication with the low pressure line 122 and a line 134, the latter being in fluid communication with a regulator valve 135 of conventional type adapted to maintain the pressure in the low pressure line 122 at a predetermined level. Regulator valve 135 is also connected to a fluid carrying line 136 connected to the sump 124.

In the aforementioned description of the circuit illustrated in Figure 3, it will be seen that hydraulic fluid under very low pressure may be simultaneously provided to the interior of tube 3 (in fluid communication with the ports 6) and to the channel 4 (in fluid communication with the ports 5). When desired, the selector valve 119 may supply hydraulic fluid at a high pressure to the channel 4, and therefore to the ports 5, while a low pressure is supplied to the tube 3 and consequently to the ports 6. Conversely, the channel 4 and ports 5 may be connected to the low pressure supply, while the tube 3 and ports 6 are connected to the high pressure supply.

Considering now in greater detail the operation of the device illustrated in Figure 1, the shaft 1 is normally rotated from the engine, the hubs 81 and 82, the pistons 17 and 47, springs 25 and 55, the pistons 31 and 61, reaction plate 8 and piston housing 14 rotating with the shaft 1. Hydraulic fluid at low pressure is normally constantly supplied to the assembly through the channel 4 and the tube 3 so that the chambers 15, 16, 75 and 78 are maintained full of hydraulic fluid normally at equal pressure. Inasmuch as this pressure is equalized throughout these chambers and the areas acted upon by this pressure are equal, the net centrifugal effect of the rotation of this hydraulic fluid is zero. The springs 25 and 55 are preloaded so as to respectively apply predetermined bias to the pistons 17 and 47 and bias these pistons to the position illustrated in Figure 1.

As previously indicated, under these circumstances, there is no drive transmitted from the shaft 1 to either of the clutch packs 106 or 107. Assuming it is desired to effect a drive from the shaft 1 through the clutch pack 107, gear 113, and gearing 114 to the countershaft 115, selector valve 119 is positioned to supply high pressure fluid to the channel 4, while continuing to supply low pressure fluid to the tube 3. This high pressure fluid will be transmitted through the ports 5 into the chamber 78. Piston 61 will therefore be moved axially along the shaft 1 until the radially outer portion 65 thereof engages the associated shoulders 39 on the adjacent bushings 38 (as illustrated in the lower half of Figure 1). It should be noted that under this condition fluid flow from chamber 16 toward chamber 15 is prevented; fluid may still flow, however, into chamber 16 through the one-way valves which have the flappers 41 thereof adjacent the piston 61. The piston 61 does not hold these flappers 41 closed inasmuch as the shoulders 39 hold the piston 61 in a position slightly spaced from the reaction plate 8. As a result, the high pressure fluid in chamber 78 will effect movement of piston 47 to the right, in the view of Figure 1, carrying the piston housing 14 with it. Chamber 15 will correspondingly reduce in volume inasmuch as snap ring 19 will carry piston 17 to the right with the housing 14, fluid passing from chamber 15 through the plurality of openings 37 in the reaction plate 8 which contain one-way valves of the type illustrated in the upper portion of Figure 1. (Fluid flow through the one-way valves of the type illustrated in the lower portion of Figure 1 is prevented inasmuch as the direction of this fluid flow is contrary to that permitted by the flappers 41 in the one-way valves oriented as illustrated in that lower portion of Figure 1.) This flow of fluid from chamber 15 into chamber 16 obviously occurs because the pressure in chamber 15, which is decreasing in volume, is greater than that in chamber 16, which is increasing in volume. The pressure in chamber 15, therefore, is also greater than the pressure in the chamber 75, radially inwardly of the chamber 15, and connected to the "low pressure" supply, this pressure differential keeping accelerating piston 31 in engagement with bracket 26, as illustrated in Figure 1, so that piston 31 cannot inhibit the transfer of fluid from chamber 15 into chamber 16. Restated in another way, piston 31 is held in engagement with the bracket 26 because the chamber 75 is connected to the low pressure source through ports 6, while chamber 15 is not so connected to the low pressure supply; the pressure in chamber 15 will, therefore, exceed that in chamber 75 during this movement of the assembly toward the right in Figure 1.

When the piston 47 is moved sufficiently toward the right to engage the clutch pack 107 and supply a force thereto, further movement to the right in the assembly is momentarily stopped. The pressures in chambers 15 and 16 therefore equalize almost immediately. The high pressure fluid in chamber 78, however, bleeds through the opening means 64 in ledge 59 of piston 61, passing into the chamber 16. The pressure in chamber 16 will therefore exceed that in chamber 15 and the plurality of flappers 41 oriented like that illustrated in the upper portion of Figure 1 will be forced against the reaction plate 8. As a result, all further interflow between chambers 15 and 16 is prevented, certain of the openings 37 being blocked by the flapper valves, while the remainder of the openings 37 are blocked by the piston 61. This increased pressure in chamber 16 effects slight further movement of piston 47 to the right in the view of Figure 1 to "lock up" the clutch pack 107; the increased pressure in chamber 15 due to this movement of the assembly is bled through the opening defining means 34 in the ledge 29 of accelerating piston 31 into the chamber 75, and out the ports 6 to the low pressure source. It should be realized that this operation proceeds with great rapidity and smoothness, the temporary interruption of movement of the piston 47 being almost imperceptible.

With clutch pack 107 in its "locked up" condition, rotation of shaft 1, as previously described, will pass through the clutch pack to the gear 113 connected thereto which, in turn, will effect rotation of gearing 114 in the countershaft 115.

When it is desired to disengage the clutch pack 107, selector valve 119 is again returned to the position in which the passage 4 is connected to the low pressure source. This will immediately reduce the pressure in the chamber 78 and the spring 25, which had been stressed by movement of the assembly toward the right in Figure 1, will effect movement of the assembly toward the left in Figure 1. It should be noted that when the chamber 78 was connected to the low pressure source through the selector valve 119, the pressure in chamber 16 could not immediately return to this low value inasmuch as the connection between chamber 16 and chamber 78 is only through the restricted opening means 64. Similarly, as spring 25 begins movement of the assembly toward the left in Figure 1, the pressure in chamber 16 tends to be increased inasmuch as the volume thereof is being decreased. Despite the fact, therefore, that the accelerator piston 61 occupied a position in engagement with the bushings 38 in the openings 37 when this return movement was initiated, the result of the higher pressure in chamber 16 than that in chamber 78 will be to force immediate movement of the piston 61 into engagement with the bracket 56, the piston 61 and bracket 56 occupying the relative positions illustrated in Figure 1. This action is ensured by virtue of the fact that, as previously described, the face 66 formed on piston 61 is spaced from the reaction plate 8 to a greater degree than the face on portion 65 of piston 61 which was in engagement with the bushings 38; as a result, the high pressure in chamber 16 is operative against this face 66 to force piston 61 away from reaction plate 8. Fluid may therefore flow from chamber 16, decreasing in volume, into chamber 15, increasing in volume, through the openings 37 having one-way valves oriented in the direction illustrated in the lower portion of Figure 1. The assembly will continue moving toward the left until the device reaches the condition illustrated in Figure 1, at which time the biasing action of springs 25 and 55 balance to hold the assembly in a neutral condition. The clutch packs 107 and 106 then, as previously described, do not transmit rotation of shaft 1 to the gearing associated therewith.

It will be obvious to those skilled in the art that engagement and disengagement of the clutch pack 106 is effected in a manner comparable to that described with regard to the clutch pack 107, so a detailed explanation of this operation will not be made.

Attention is now directed to Figure 2, which illustrates a modification. Elements bearing the same numeral in Figure 2 are identical with those of Figure 1. The only difference between the structures illustrated in Figures 1 and 2 resides in the fact that the accelerating pistons 31 and 61 of Figure 1 are slightly modified. In Figure 2 these modified pistons are respectively designated 31' and 61'. Piston 31' is provided with a plurality of circumferentially spaced apertures 141, each of which receives one end of a spring 142, the opposite end of which abuts against the reaction plate 8. In similar fashion, the piston 61' is provided with a plurality of circumferentially spaced openings 143, each of which receives one end of a spring 144, the opposite end of which abuts against the reaction plate 8. These springs 142 and 144 are relatively weak, but supply a slight bias to their respective associated accelerating pistons which assist in moving these pistons away from the reaction plate 8 during the "return" movement of the assembly from either of its positions in which the clutch packs associated therewith are "locked up" to the neutral position of the assembly.

From the foregoing description of the construction and operation of the devices illustrated in the figures, it will be seen that they are simple and relatively economical, and yet operate with certainty. In this regard, it should be noted that the accelerating pistons will move to block fluid flow through certain of the one-way valves in the openings 37 of the reaction plate 8 even though the pressure difference between the "high pressure" and "low pressure" sources are relatively small. As a result, even though through some fault in the supply system the "high pressure" applied to engage one of the clutch packs is at a lower pressure level than desired, the proper clutch pack will nevertheless be "locked up," without any partial slipping. In addition, the centering mechanism is extremely simple, and does not depend on any accumulative effect of a plurality of springs. It should further be noted that one or the other of the accelerating pistons is always held in its position most spaced from the reaction plate when any movement of the housing 14 occurs, this being accomplished by and ensured by the pressure differentials acting upon such piston as previously described. In addition, simultaneous actuation of both of the clutch packs is impossible, and the effects of centrifugal force on the oil in the clutch housing are nullified. Furthermore, inasmuch as the clutch housing remains at all times filled with oil, extremely rapid engagement of either of the clutch packs is effected. Furthermore, as previously noted, the clutch operation is characterized by extreme smoothness, transfer of the high pressure from the radially inner chambers to the radially outer chambers occurring only gradually through the restricted opening means provided in the ledges in the accelerating pistons.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a hydraulically operable clutch assembly, a housing, clutch means, spaced piston means movable to engage said clutch means, reaction means defining a plurality of first chamber means with said piston means and housing, a plurality of one-way valve means extending between said plurality of first chamber means, certain of said valve means preventing fluid flow in one direction only and others of said valve means preventing fluid flow in the opposite direction only, and other piston means defining a plurality of other chamber means with said first mentioned piston means and movable into engagement with at least certain of said one-way valve means upon the occurrence of predetermined pressure differences between said first and other chamber means to prevent fluid flow through said certain one-way valve means.

2. In a hydraulically operable clutch assembly, a housing, clutch means, spaced piston means movable to engage said clutch means, reaction means defining a plurality of first chamber means with said piston means and housing, a plurality of one-way valve means in said reaction means extending between said plurality of first chamber means, certain of said valve means preventing fluid flow in one direction only and others of said valve means preventing fluid flow in the opposite direction only, and other piston means defining a plurality of other chamber means with said first mentioned piston means and movable into engagement with at least certain of said one-way valve means upon the occurrence of predetermined pressure differences between said first and other chamber means to prevent fluid flow through said certain one-way valve means.

3. In a hydraulically operable clutch assembly, a housing, clutch means, spaced piston means movable to engage said clutch means, reaction means defining a plurality of first chamber means with said piston means and housing, a plurality of opening defining means extending through said reaction means, a plurality of one-way valve means respectively disposed in said opening defining means normally communicating said plurality of first chamber means, certain of said valve means preventing fluid flow in one direction only and others of said valve means preventing fluid flow in the opposite direction only, and other piston means defining a plurality of other chamber means with said first mentioned piston means and movable into engagement with at least certain of said one-way valve means upon the occurrence of predetermined pressure differences between said first and other chamber means to prevent fluid flow through said certain one-way valve means.

4. The device defined in claim 3 in which said one-way valve means comprise flexible flappers associated with each of said opening defining means respectively, said flappers each being of greater area than the area of the end of the opening associated therewith whereby said flapper prevents fluid flow through said associated opening defining means upon the occurrence of predetermined pressure differentials on opposite sides of said reaction means.

5. The device defined in claim 3 in which opening defining means are provided which communicate one of said other chamber means with one of said first chamber means, said last-mentioned opening defining means being small in comparison with the volume of said chamber means to provide only restricted communication between said one other chamber means and said one first chamber means.

6. In a hydraulically operable clutch assembly adapted for mounting upon a rotatable shaft, a generally annular housing, piston means respectively at opposite ends of said housing and movable therewith, a reaction plate in said housing intermediate said piston means and held against axial movement relative to the shaft, said reaction plate defining a pair of first chamber means with said piston means and housing, a plurality of spaced opening defining means extending through said reaction plate, a plurality of one-way valve means respectively disposed in said opening defining means comprising flexible flappers, means attaching certain of said flappers to one side of said reaction plate and means attaching other of said flappers to the opposite side of said reaction plate whereby said one-way valve means are so arranged that certain ones thereof prevent fluid flow in one direction only and other ones thereof prevent fluid flow in the opposite direction only, a second pair of piston means respectively associated with said first mentioned piston means to define therewith secondary chamber means, said second piston means comprising portions movable toward said reaction plate upon the occurrence of predetermined pressure differences between said first and secondary chamber means to prevent fluid flow through at least certain of said one-way valve means.

7. In a hydraulically operable clutch assembly, a housing, clutch means, spaced piston means movable to engage said clutch means, reaction means defining a plurality of first chamber means with said piston means and housing, a plurality of one-way valve means extending between said plurality of first chamber means, certain of said valve means preventing fluid flow in one direction only and others of said valve means preventing fluid flow in the opposite direction only, and other piston means defining in part other chamber means and movable upon the occurrence of predetermined pressure differences between said first and other chamber means to prevent fluid flow through certain of said one-way valve means.

8. The device defined in claim 7 in which means defining a restricted opening between said first and other chamber means are provided which permit delayed pressure equalization between the chamber means.

References Cited in the file of this patent

UNITED STATES PATENTS

| 857,393 | Hagman | June 18, 1907 |
| 2,386,220 | Lawler | Oct. 9, 1945 |
| 2,464,538 | Vanderzee | Mar. 15, 1949 |
| 2,632,544 | Hockert | Mar. 24, 1953 |

FOREIGN PATENTS

| 522,088 | Belgium | Aug. 31, 1953 |